United States Patent
Tojo et al.

(10) Patent No.: US 10,181,075 B2
(45) Date of Patent: Jan. 15, 2019

(54) IMAGE ANALYZING APPARATUS, IMAGE ANALYZING, AND STORAGE MEDIUM

(71) Applicant: CANON KABUSHIKI KAISHA, Tokyo (JP)

(72) Inventors: Hiroshi Tojo, Fuchu (JP); Tomoya Honjo, Tokyo (JP); Shinji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 15/292,020

(22) Filed: Oct. 12, 2016

(65) Prior Publication Data
US 2017/0109572 A1 Apr. 20, 2017

(30) Foreign Application Priority Data
Oct. 15, 2015 (JP) .................. 2015-204025

(51) Int. Cl.
G06K 9/00 (2006.01)
G06K 9/46 (2006.01)
H04N 5/247 (2006.01)
G06T 7/70 (2017.01)

(52) U.S. Cl.
CPC ..... *G06K 9/00362* (2013.01); *G06K 9/00771* (2013.01); *G06K 9/4604* (2013.01); *G06T 7/70* (2017.01); *H04N 5/247* (2013.01)

(58) Field of Classification Search
CPC .......... G06K 9/00362; G06K 9/00771; G06K 9/4604; G06T 7/70; H04N 5/247
See application file for complete search history.

(56) References Cited

U.S. PATENT DOCUMENTS 6,115,506 A * 9/2000 Koshinaka ........... G06K 9/3283
382/177
6,711,291 B1 * 3/2004 Stubler ................ G06K 9/3233
345/632

(Continued)

FOREIGN PATENT DOCUMENTS

EP 2927873 A1 10/2015
JP 2009-265922 A 11/2009

OTHER PUBLICATIONS

Chris Stauffer, et al., "Adaptive Background Mixture Models for Real-time Tracking," The Artificial Intelligence Laboratory Massachusetts Institute of Technology Cambridge, MA, pp. 1-7.

(Continued)

*Primary Examiner* — Ming Y Hon
(74) *Attorney, Agent, or Firm* — Canon U.S.A.Inc., IP Division

(57) ABSTRACT

An information processing apparatus includes an evaluation unit configured to evaluate whether a partial region of a photographing range of an imaging unit is a region suitable for analysis processing to be performed based on feature quantities of an object, with reference to a track of the object in an image captured by the imaging unit, and an output control unit configured to control the information processing apparatus to output information reflecting an evaluation result obtained by the evaluation unit. Accordingly, the information processing apparatus can support a user to improve the accuracy of the analysis processing to be performed based on the feature quantities of the object.

14 Claims, 8 Drawing Sheets

(56) References Cited

U.S. PATENT DOCUMENTS

| | | | |
|---|---|---|---|
| 8,416,982 B2* | 4/2013 | Magai | G06F 17/30256 |
| | | | 382/100 |
| 2005/0180611 A1* | 8/2005 | Oohashi | G06K 9/00234 |
| | | | 382/118 |
| 2005/0213818 A1* | 9/2005 | Suzuki | G06K 9/4609 |
| | | | 382/190 |
| 2007/0237387 A1 | 10/2007 | Avidan | |
| 2010/0177159 A1* | 7/2010 | Tojo | H04N 5/232 |
| | | | 348/14.16 |
| 2013/0155247 A1* | 6/2013 | Wang | H04N 9/735 |
| | | | 348/159 |
| 2014/0071330 A1* | 3/2014 | Zhang | H04N 5/2258 |
| | | | 348/345 |
| 2014/0341427 A1 | 11/2014 | Kawano | |
| 2015/0117791 A1* | 4/2015 | Mertens | H04N 19/176 |
| | | | 382/239 |
| 2015/0279049 A1* | 10/2015 | Tojo | G06K 9/4609 |
| | | | 382/164 |
| 2015/0302256 A1* | 10/2015 | Ikeda | G06K 9/00771 |
| | | | 382/103 |

OTHER PUBLICATIONS

Ryan Layne, et al., "Towards Person Identification and Re-Identification With Attributes," School of EECS, Queen Mary University of London, UK {rlayne,tmh,sgg} @eecs.qmul.ac.uk, pp. 1-10.

\* cited by examiner

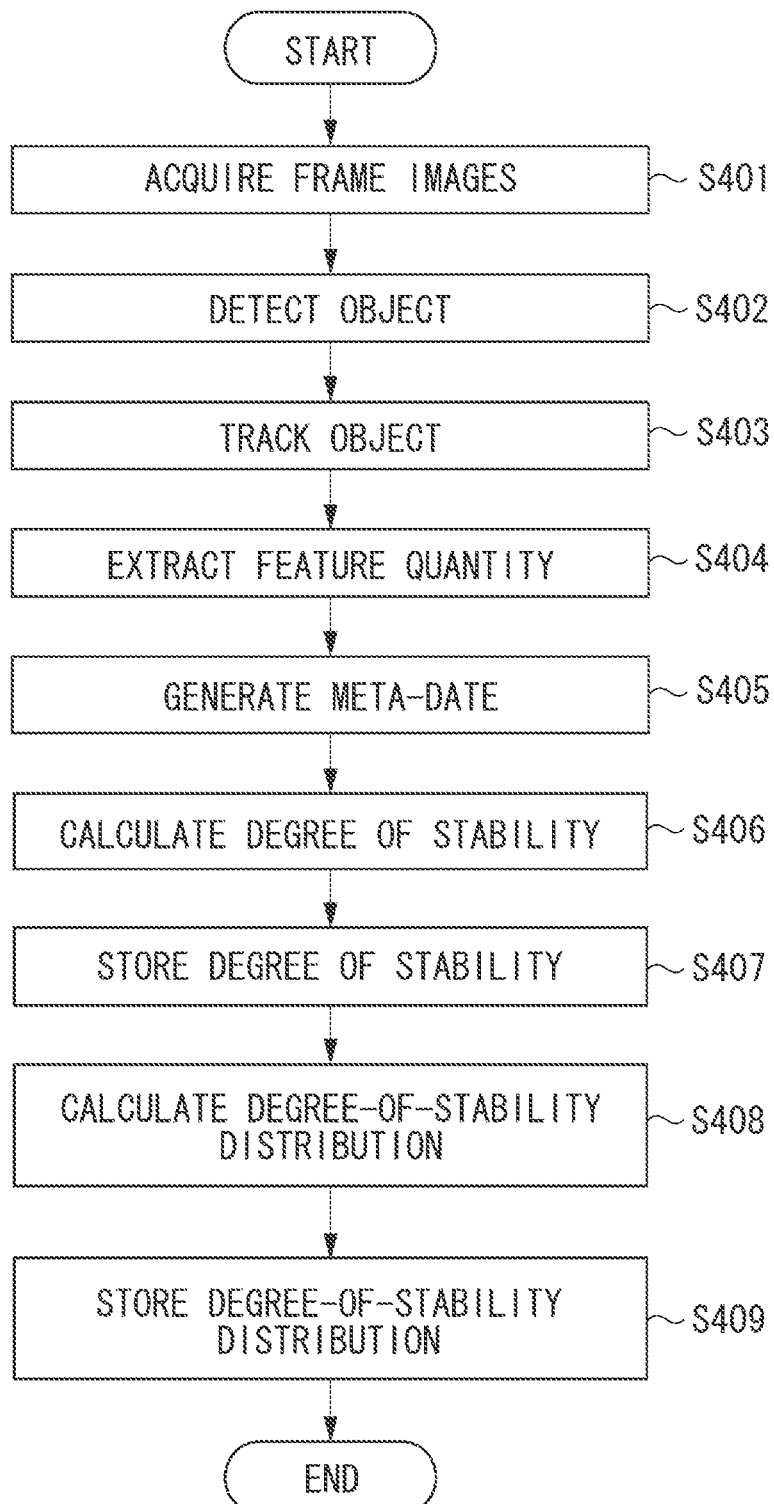

IMAGE ANALYZING APPARATUS, IMAGE ANALYZING, AND STORAGE MEDIUM

BACKGROUND OF THE INVENTION

Field of the Invention

The present invention relates to an information processing apparatus, an information processing method, and a storage medium.

Description of the Related Art

A technique capable of detecting a human body region from a camera image, acquiring feature quantities (e.g., colors or shape of clothes) from the detected human body region, and determining whether a target human body is included in a plurality of images based on a comparison between the acquired feature quantities is conventionally known. As discussed in Japanese Patent Application Laid-Open No. 2009-265922, there is a conventional technique capable of preliminarily performing processing for acquiring feature quantities from a plurality of cameras and identifying the presence of a target human body based on a comparison between the feature quantities acquired by the plurality of cameras. According to the above-mentioned technique, it is feasible to track a target human body that straddles the images captured by a plurality of cameras by integrating tracking results of the target human body obtained by respective cameras.

However, for example, in a case where a camera is fixed at a predetermined position for the purpose of monitoring, continuously performing an image-capturing operation in such a way as to constantly acquire stable feature quantities from a target human body is difficult. For example, if the moving direction of a target human body suddenly changes, an image blur may occur because the direction of the object relative to the camera changes steeply. Further, the color of a backpack may suddenly appear when the target human body changes the moving direction. In this case, different feature quantities will be mixed together undesirably. It is difficult to acquire highly reliable results in analysis processing to be performed based on feature quantities of a target object, in such a situation.

SUMMARY OF THE INVENTION

The present invention is directed to a technique capable of supporting a user to improve the accuracy of analysis processing to be performed based on feature quantities of a target object. For example, an information processing apparatus has the following configuration.

According to an aspect of the present invention, the information processing apparatus includes an evaluation unit configured to evaluate whether a partial region of a photographing range of an imaging unit is a region suitable for analysis processing to be performed based on feature quantities of an object, with reference to a track of the object in an image captured by the imaging unit, and an output control unit configured to control the information processing apparatus to output information reflecting an evaluation result obtained by the evaluation unit.

Further features of the present invention will become apparent from the following description of exemplary embodiments with reference to the attached drawings.

BRIEF DESCRIPTION OF THE DRAWINGS

FIG. 4 is a flowchart illustrating degree-of-stability distribution calculation processing.

DESCRIPTION OF THE EMBODIMENTS

Exemplary embodiments of the present invention will be described in detail below with reference to attached drawings.

Figure 1:
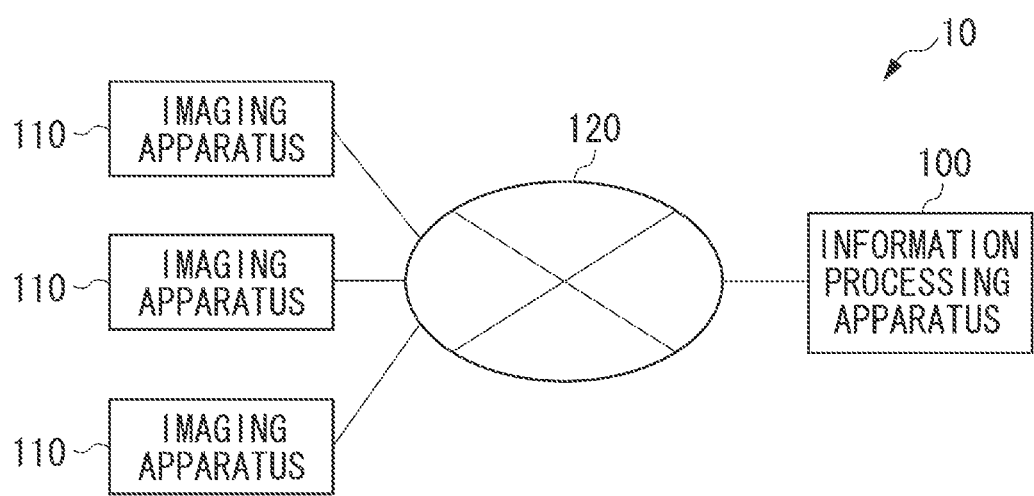
FIG. 1 illustrates an entire arrangement of an imaging system.

FIG. 1 illustrates an entire arrangement of an imaging system 10 according to an exemplary embodiment. The imaging system 10 includes an information processing apparatus 100 and a plurality of imaging apparatuses 110. Although the imaging system 10 illustrated in FIG. 1 includes three imaging apparatuses 110, the number of the imaging apparatuses 110 included in the imaging system 10 is not limited to a specific number. The information processing apparatus 100 and the imaging apparatuses 110 are mutually connected via a network 120. Each imaging apparatus 110 includes a photographing unit. The imaging apparatus 110 transmits an image captured by the photographing unit to the information processing apparatus 100. In the present exemplary embodiment, it is assumed that the captured image is a moving image (i.e., a video).

The information processing apparatus 100 extracts feature quantities of a target object from an image captured by the imaging apparatus 110. The information processing apparatus 100 identifies each object based on the feature quantities in respective captured images obtained by the plurality of imaging apparatuses 110. identification processing of an object to be performed by the information processing apparatus 100 is an example of analysis processing of a captured image based on feature quantities. In the present exemplary embodiment, the identification processing is a mere example of the analysis processing. However, the analysis processing is not limited to the identification processing and may be any other processing performed based on feature quantities. Further, in the present exemplary embodiment, an identification target object is a human body. However, the identification target is not limited to the human body and may be a vehicle or any other non-human body.

Figure 2:
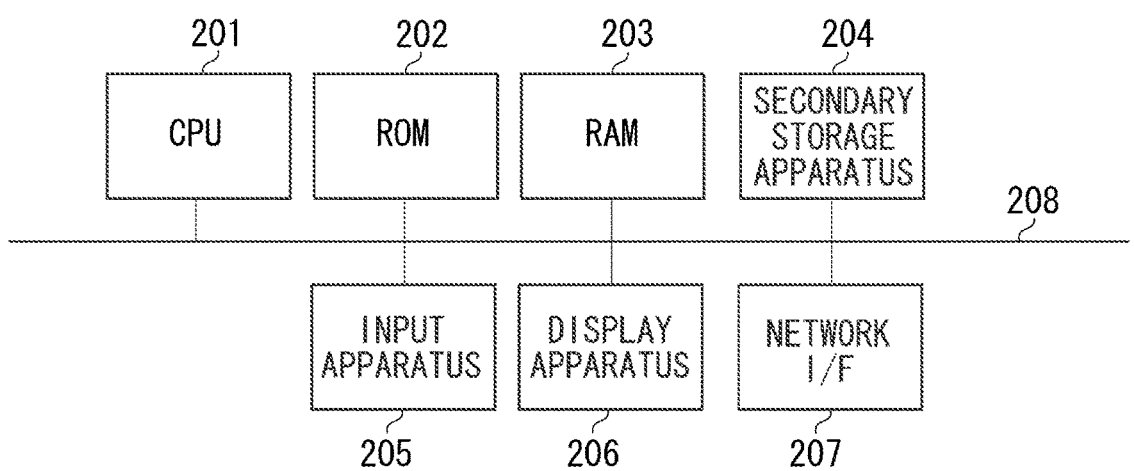
FIG. 2 illustrates a hardware configuration of an information processing apparatus.

FIG. 2 illustrates a hardware configuration of the information processing apparatus 100. A central processing unit (CPU) 201 executes processing according to instructions of programs stored in a read only memory (ROM) 202 or a random access memory (RAM) 203. The ROM 202 is a nonvolatile memory, which stores programs and data that are necessary to control the information processing apparatus 100. The RAM 203 is a volatile memory, which stores temporary data (e.g., frame image data and pattern discrimination results). A secondary storage apparatus 204 is a secondary rewritable storage apparatus, such as a hard disk drive or a flash memory, which stores image information, image processing programs, and various setting contents. To realize functions and processing of the information processing apparatus 100, the CPU 201 reads the programs from the ROM 202 or the secondary storage apparatus 204 and executes processing according to the respective programs.

An input apparatus 205 is a keyboard or a mouse, which enables a user to input instructions, data, or any other information. A display apparatus 206 is a cathode ray tube (CRT) device or a liquid crystal display device, which displays processing results to be presented to the user. A network interface (I/F) 207 is a modem or a local area network (LAN) terminal, which connects the information processing apparatus 100 to an appropriate network (e.g., internet or intranet). A bus 208 connects the above-mentioned hardware devices 201 to 207 so that mutual data input/output operations can be realized.

Figure 3:
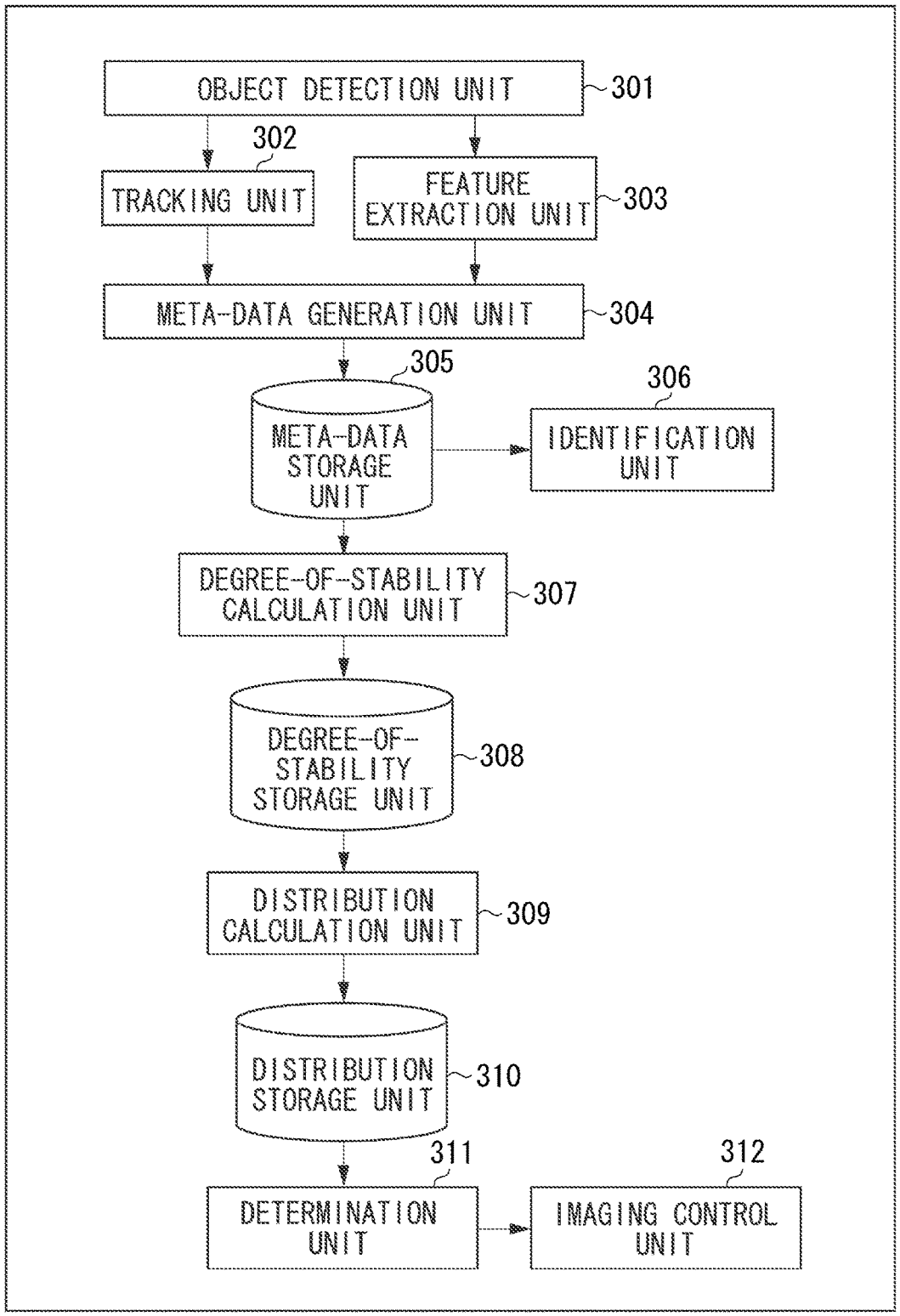
FIG. 3 illustrates a software configuration of the information processing apparatus.

FIG. 3 illustrates a software configuration of the information processing apparatus 100. An object detection unit 301 detects an object region from a video captured by the imaging apparatus 110 and received via the network I/F 207. A tracking unit 302 associates an object region in a processing target frame image, which has been detected by the object detection unit 301, with an object region detected in a preceding frame image that precedes the processing target frame image. The tracking unit 302 tracks a detected predetermined object in the captured image by associating the object regions in a plurality of frame images. Thus, the tracking unit 302 can obtain track information indicating a tracking result of the target object included in the captured images. More specifically, track information represents the movement of an object on a screen. In this case, each user may input the track information via an operation input device (not illustrated), such as a mouse or a touch panel, while viewing the captured images.

A feature extraction unit 303 extracts feature quantities from the object region detected by the object detection unit 301. For example, the feature quantities of each object include information about color/edge/texture, colors of clothes, color of hair, shapes of face organs, stature, presence of sunglasses, presence of beard, and presence of a bag or any other belonging. A meta-data generation unit 304 generates meta-data of the captured image based on the track information obtained through the above-mentioned processing of the tracking unit 302 and feature quantity information obtained through the above-mentioned processing of the feature extraction unit 303. A meta-data storage unit 305 stores the meta-data generated by the meta-data generation unit 304. In the present exemplary embodiment, the meta-data storage unit 305 is the RAM 203 or the secondary storage apparatus 204. When the meta-data is stored in the meta-data storage unit 305, the meta-data is associated with an apparatus identification (ID) (identification information) of the imaging apparatus 110 that has captured the currently processed image. An identification unit 306 collates (or compares) the objects included in a plurality of images captured by respective imaging apparatuses 110 based on the feature quantity information stored in the meta-data storage unit 305, and identifies the object.

A degree-of-stability calculation unit 307 calculates a degree of stability based on the track information stored in the meta-data storage unit 305, and stores information about the calculated stability in a degree-of-stability storage unit 308. The degree-of-stability calculation unit 307 is the RAM 203 or the secondary storage apparatus 204. In the present exemplary embodiment, the degree of stability is a value indicating easiness in extracting stable feature quantities of an object in a partial region of a photographing range corresponding to an image captured by each imaging apparatus 110. In a case where there is a higher possibility that appropriately extracting the feature quantities is feasible, the degree of stability is higher. On the other hand, in a case where there is a lower possibility that appropriately extracting the feature quantities is feasible, the degree of stability is lower. For example, it is assumed that the imaging apparatus 110 captures images of a human body (i.e., an object) turning a corner. In this case, the object angle changes at the corner. Therefore, some feature quantities (e.g., glasses) may not be captured continuously by the imaging apparatus 110. In such a case, the degree of stability becomes lower. Further, when the moving speed of an object is high, appropriately extracting feature quantities may be difficult because an image will include a blurred object. Accordingly, in a specific region, if the moving speed of the object becomes higher, the degree of stability becomes lower correspondingly. An example of stability calculation processing will be described in detail below.

A distribution calculation unit 309 calculates a degree-of-stability distribution of an image captured by each imaging apparatus 110, at every predetermined time, based on the degree of stability calculated by the degree-of-stability calculation unit 307. Further, the distribution calculation unit 309 stores information about the calculated degree-of-stability distribution in a distribution storage unit 310. In the present exemplary embodiment, the distribution storage unit 310 is the RAM 203 or the secondary storage apparatus 204. The degree-of-stability distribution is information indicating the degree of stability of each partial region of the captured image. An example of degree-of-stability distribution calculation processing will be described in detail below. A determination unit (i.e., an evaluation unit) 311 determines (or evaluates) whether each partial region of the captured image is a region suitable for identification processing (analysis processing) to be performed based on feature quantities of the object with reference to the degree-of-stability distribution.

An imaging control unit 312 controls imaging conditions of each imaging apparatus 110. More specifically, the imaging control unit 312 determines control parameters as the imaging conditions of each imaging apparatus 110 and transmits the determined control parameters to the corresponding imaging apparatus 110 via the network I/F 207. In the present exemplary embodiment, the control parameters include a parameter change command and various imaging conditions (e.g., a frame rate, a shutter speed, an exposure, and pan/tilt/zoom) of each imaging apparatus 110. Each imaging apparatus 110 performs an image capturing operation based on the control parameters received from the information processing apparatus 100. For example, the imaging apparatus 110 can change an imaging frame rate from 1 fps (the number of frames per second) to 30 fps.

FIG. 4 is a flowchart illustrating an example of the degree-of-stability distribution calculation processing performed by the information processing apparatus 100. In step S401, the object detection unit 301 acquires frame images (a video) captured by each imaging apparatus 110. In the present exemplary embodiment, it is assumed that a frame ID (i.e., time information) is allocated to each frame image. Further, it is assumed that the apparatus ID of the corresponding imaging apparatus 110 is allocated to each frame image.

In step S402, the object detection unit 301 detects an object from each frame image. A background difference method for detecting a difference between an input video and a background model generated beforehand from a video exclusively imaging only the background is employable as a first example of the object detection processing to be performed in step S402. The following is a reference literature that describes details of the above-mentioned processing.

Stauffer C, Grimson W. E. L. Adaptive background mixture models for real-time tracking. In Proceedings. 1999 IEEE Computer Society Conference on Computer Vision and Pattern Recognition (Cat. No PR00149). IEEE Comput. Soc. Part Vol. 2, 1999

A second example of the human body detection is a 2-class discrimination method for scanning an input image with a detection window having a predetermined size, and determining whether a pattern image being cut out of an image scanned with the detection window is a human body. According to the above-mentioned discrimination method, AdaBoost is employed to effectively combine numerous weak discriminators in such a way as to constitute a discriminator that is excellent in discrimination accuracy. Further, the above-mentioned discrimination method includes serially connecting the above-mentioned discriminators in such a way as to constitute a cascade-type detector. The weak discriminator is constituted by Histograms of Oriented Gradients (HOG) feature quantities. First, the cascade-type detector removes many pattern candidates that are apparently different from the object by using anterior-stage simple discriminators. Then, the cascade-type detector discriminates a human body from the remaining candidates by using posterior-stage complicated discriminators having higher identification capability. The following is a reference literature that describes details of the above-mentioned processing.

United States Patent Publication Application No. 2007/0237387

In the present exemplary embodiment, the object is not limited to the human body and can be any other object. For example, if the object is a vehicle, it is useful to create the above-mentioned second exemplary discriminator applicable to the vehicle.

The object detection unit 301 expresses the object region by using x-coordinate and y-coordinate values of two points (e.g., an upper-left corner point and a lower-right corner point) of a rectangle surrounding the human body, which are defined relative to an origin positioned at the upper left point of the frame image. The object detection unit 301 may use a mask image that allocates a numerical value 1 to a pixel corresponding to the human body and a numerical value 0 to a pixel corresponding to other portions. Using the mask image enables a human-related pixel to be discriminated from any non-human pixel that may be involved when the object region is expressed as a rectangle.

In step S403, the tracking unit 302 selects one frame image as a processing target. Hereinafter, a frame image of the processing target is referred to as a "target frame image." Further, a frame image that precedes the target frame image is referred to as a "preceding frame image." The tracking unit 302 performs tracking processing for identifying an object that corresponds to the target frame image from a plurality of objects detected in the preceding frame image. Then, the tracking unit 302 outputs a tracking processing result as track information. The track information is information unique to each object. More specifically, the track information includes an object ID that identifies each object, a frame ID that identifies a frame image including the object, and a position of the object in the frame image. The position of the object is information that indicates x and y coordinates of a central position of the object region.

Various methods are employable to realize the above-mentioned tracking processing. For example, there is a method for associating the central position of the object region in the target frame image with the central position of a closest object region in the preceding frame image. As another method, a pattern matching using an object region of a preceding frame image as a collation pattern is employable. Any other methods capable of mutually associating corresponding objects in a plurality of frames are employable.

In step S404, the feature extraction unit 303 extracts feature quantities of the object from the object region of the target frame image. The feature extraction unit 303 associates the extracted feature quantities with information, i.e., the apparatus ID, the object ID, and the object position of the imaging apparatus 110 corresponding to the target frame image. Then, the feature extraction unit 303 outputs the associated feature quantity information to the meta-data generation unit 304. The feature quantities include a color, luminance, and an edge extracted from the object region.

Further, as another example, the feature extraction unit 303 may extract any other information (e.g., a bag, sunglasses, and beard) that can identify the presence of a human body, as feature quantities. Each feature quantity can be expressed by using a numerical value in a range from 0 to 1. With respect to the bag information, a numerical value 0 indicates a state where no bag is present and a numerical value 1 indicates a state where a bag is surely present. Using an intermediate value (e.g., 0.5) may be useful in a case where the presence cannot be clearly determined. In the above-mentioned extraction processing, shape features (e.g., Local Binary Patterns (LBP) feature quantities or HOG feature quantities) or texture features that can be extracted by using a Gabor filter or a Schmid filter may be used. For example, in a case where the feature quantity to be extracted is a bag, numerous correct answer images can be prepared for both a person who carries a bag and a person who does not carry a bag. It is feasible to generate an identifier that can identify feature quantities corresponding to the correct answers and other feature quantities in a feature quantity space. In the present exemplary embodiment, if the feature quantity to be extracted is a bag, a label indicating whether a person carries a bag or not is allocated to each correct answer image. A support vector machine (SVM) is an example of the identifier. The following is a reference literature that describes details of the above-mentioned processing.

R. Layne, T. M. Hospedales, and S. Gong. "Towards Person Identification and Re-identification with Attributes." In Proc. ECCV, 2012

In step S405, the meta-data generation unit 304 generates meta-data based on the track information generated by the tracking unit 302 and the feature quantities generated by the feature extraction unit 303. Further, the meta-data generation unit 304 stores the generated meta-data in the meta-data storage unit 305. The information processing apparatus 100 repeats the processing in steps S401 to S405 until a user inputs a termination instruction via the input apparatus 205. In this manner, the information processing apparatus 100 continuously generates meta-data of respective frame images corresponding to the image captured by the imaging apparatus 110 and successively stores the generated meta-data in the meta-data storage unit 305.

The information processing apparatus 100 performs processing in step S406 and subsequent steps to calculate a degree-of-stability distribution. The information processing apparatus 100 calculates the degree-of-stability distribution of each imaging apparatus 110 by performing the processing in step S406 and subsequent steps for each imaging apparatus 110. In step S406, the degree-of-stability calculation unit 307 extracts track information about the processing target imaging apparatus 110 from the meta-data storage unit 305, and calculates the degree of stability based on the extracted track information (namely, performs calculation processing). As mentioned above, the degree of stability indicating the capability of acquiring feature quantities is variable depending on the movement of an object in the video. The moving direction change and the moving speed of the object are factors that change the degree of stability.

If the moving direction of the object changes greatly, the direction of the object relative to the imaging apparatus 110 changes steeply and different features will be mixed together undesirably. Therefore, formulation is performed in such a manner that the degree of stability becomes lower when the change of the moving direction is greater. It is feasible to refer to the track information and obtain a change angle in the frame image with reference to position coordinate information about the object in the target frame image and the object in the preceding frame image to which the same object ID is allocated. More specifically, the degree-of-stability calculation unit 307 uses the following formula to calculate the degree of stability.

$$1-\tan^{-1}((Y2-Y1)/(X2-X1))/360$$

In the formula, (X1, Y1) represents the position of the object in the preceding frame image, and (X2, Y2) represents the position of the object in the target frame image. Further, the degree of stability is a numerical value between 0 and 1. The maximum stability value is 1.

As another method, it may be possible to calibrate the imaging apparatus 110 beforehand so that the degree-of-stability calculation unit 307 can convert coordinate values in the imaging apparatus 110 into three-dimensional coordinate values in an actual space, and to perform calculations in the actual space. It is feasible to obtain a motion vector in the actual space by converting the position of an object into coordinate values on a ground plane (i.e., a floor surface). In addition, it is feasible to calculate a vector connecting the imaging apparatus 110 and the object in the actual space. Therefore, obtaining a sum of two vectors can enhance the accuracy in the angle change calculation.

If the moving speed of an object is large, a blurred image will be obtained and features of the object and the background will be mixed together undesirably. Accordingly, formulating in such a manner that the degree of stability becomes 0 when the moving speed is equal to or greater than a predetermined speed is useful. An interval of respective frames is constant. Therefore, a moving distance of an object between different frames, which can be expressed by the number of pixels, can be regarded as the speed on the screen. More specifically, the degree-of-stability calculation unit 307 determines that the degree of stability is 0 if the following condition is satisfied. Otherwise, the degree of stability is regarded as 1. The speed threshold can be obtained beforehand with reference to a speed-to-object blur relationship.

$$(X2-X1)^2+(Y2-Y1)^2>(\text{speed threshold})^2$$

The degree-of-stability calculation unit 307 calculates the degree of stability for each of the above-mentioned two factors and uses the minimum stability value. In step S407, the degree-of-stability calculation unit 307 stores the above-mentioned calculated stability information in the storage unit while associating each data with the apparatus ID, the frame ID, and the position in the frame image (i.e., the central position coordinates of the object region in the target frame image).

The degree-of-stability calculation unit 307 repetitively performs the processing in steps S406 and S407 for respective frame images corresponding to the predetermined time, so that the degree-of-stability storage unit 308 can store a plurality of degree-of-stability values for each position on the frame image. Thus, it can be assumed that the number of objects having moved or passed across an imaging range of the imaging apparatus 110 is sufficient for the evaluation of stability. Totaling a plurality of degree-of-stability values calculated for respective frame images for each object at each position on the captured image is effective to attenuate an object-dependent element and surely obtain environment (position)-dependent stability information.

Figure 5A:
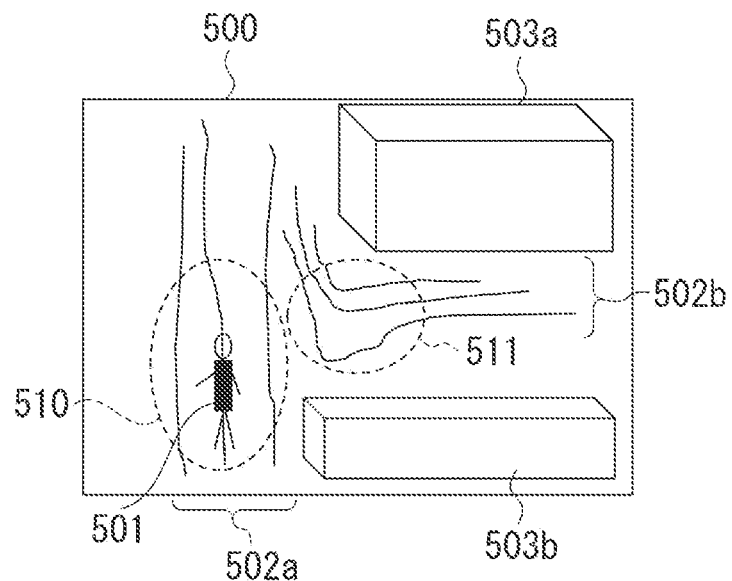
FIGS. 5A and 5B illustrate the degree-of-stability distribution calculation processing.

FIG. 5A illustrates details of the degree-of-stability calculation processing (performed in step S406). A captured image 500 includes an object (e.g., human body) 501 and obstacles 503a and 503b. It is now assumed that two types of tracks 502a and 502b of the object have been obtained from a plurality of images captured during a predetermined time period. The track 502a represents a group of tracks along which the object 501 has moved straight from the far side to the near side when seen from the imaging apparatus 110. The track 502b represents a group of tracks along which the object 501 has turned right from the far side when seen from the imaging apparatus 110, because of the presence of the obstacles 503a and 503b. In this case, there is a higher possibility that feature quantities can be stably extracted in a region 510 because a change amount in the moving direction of the object is smaller. On the other hand, there is a higher possibility that the extraction of feature quantities cannot be performed stably in a region 511 irrespective of the object because the change amount in the moving direction tends to be greater at the corner.

Referring back to FIG. 4, if the stability information obtained during the predetermined time has been stored in the distribution storage unit 310, then in step S408, the distribution calculation unit 309 calculates the degree-of-stability distribution based on the stability information stored in the distribution storage unit 310. More specifically, the distribution calculation unit 309 reads stability information associated with the apparatus ID of the processing target imaging apparatus 110 obtained during the predetermined time, and totals the stability information for each position in the captured image. An exemplary totaling method is obtaining a histogram by dividing the stability information into a plurality of 0.1 bins and obtaining a mode or a median. The possibility that numerous objects pass through the same position is lower. Therefore, for example, it may be possible to divide the screen into a plurality of blocks and perform totaling for each block while regarding the environment in each block as being similar.

Figure 5B:
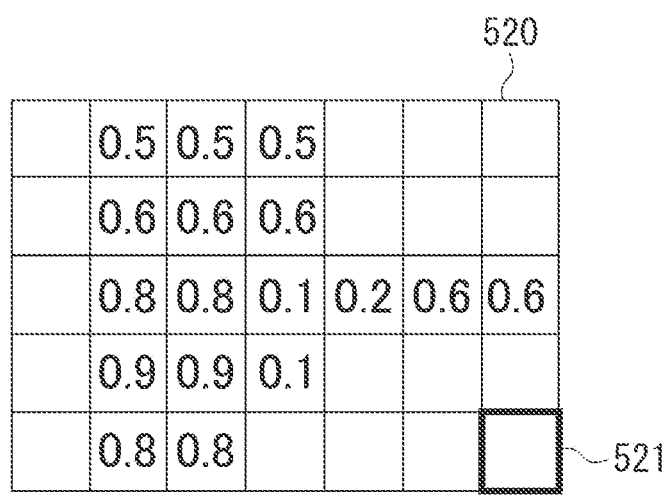

FIG. 5B illustrates details of the degree-of-stability distribution calculation processing (performed in step S408). As illustrated in FIG. 5B, a captured image 520 is divided into a plurality of blocks 521. The distribution calculation unit 309 calculates a mode of the degree-of-stability for each block. A numerical value illustrated in each block 521 of FIG. 5B is the obtained mode of each block. The captured image 520 illustrated in FIG. 5B corresponds to the captured image 500 illustrated in FIG. 5A. It is understood that the mode of a block corresponding to the region 510 of the captured image 500 is higher and the mode of a block corresponding to the region 511 is lower. Further, it is useful to allocate a minus value or any other values discriminable from the mode (i.e., the value in the range from 0 to 1) to a block in which the movement of an object cannot be observed, so that identifying the block in which no object has been observed becomes feasible.

Referring back to FIG. 4, in step S409 (namely after completing the processing in step S408), the distribution calculation unit 309 stores the calculated degree-of-stability distribution in the distribution storage unit 310. If there is any degree-of-stability distribution already stored in the distribution storage unit 310, the distribution calculation unit 309 overwrites the previously stored degree-of-stability distribution with the presently obtained degree-of-stability distribution. In other words, the distribution calculation unit 309 updates the degree-of-stability distribution at every predetermined time. The distribution storage unit 310 can constantly store the degree-of-stability distribution at appropriate timing that is not so different from the processing timing, in response to a temporal environment change. The information processing apparatus 100 performs processing in steps S406 to S409 for all imaging apparatuses 110, as described above, and stores the degree-of-stability distributions of all imaging apparatuses 110. Further, the information processing apparatus 100 updates the degree-of-stability distribution by periodically repeating the degree-of-stability calculation processing as described above.

Figure 6:
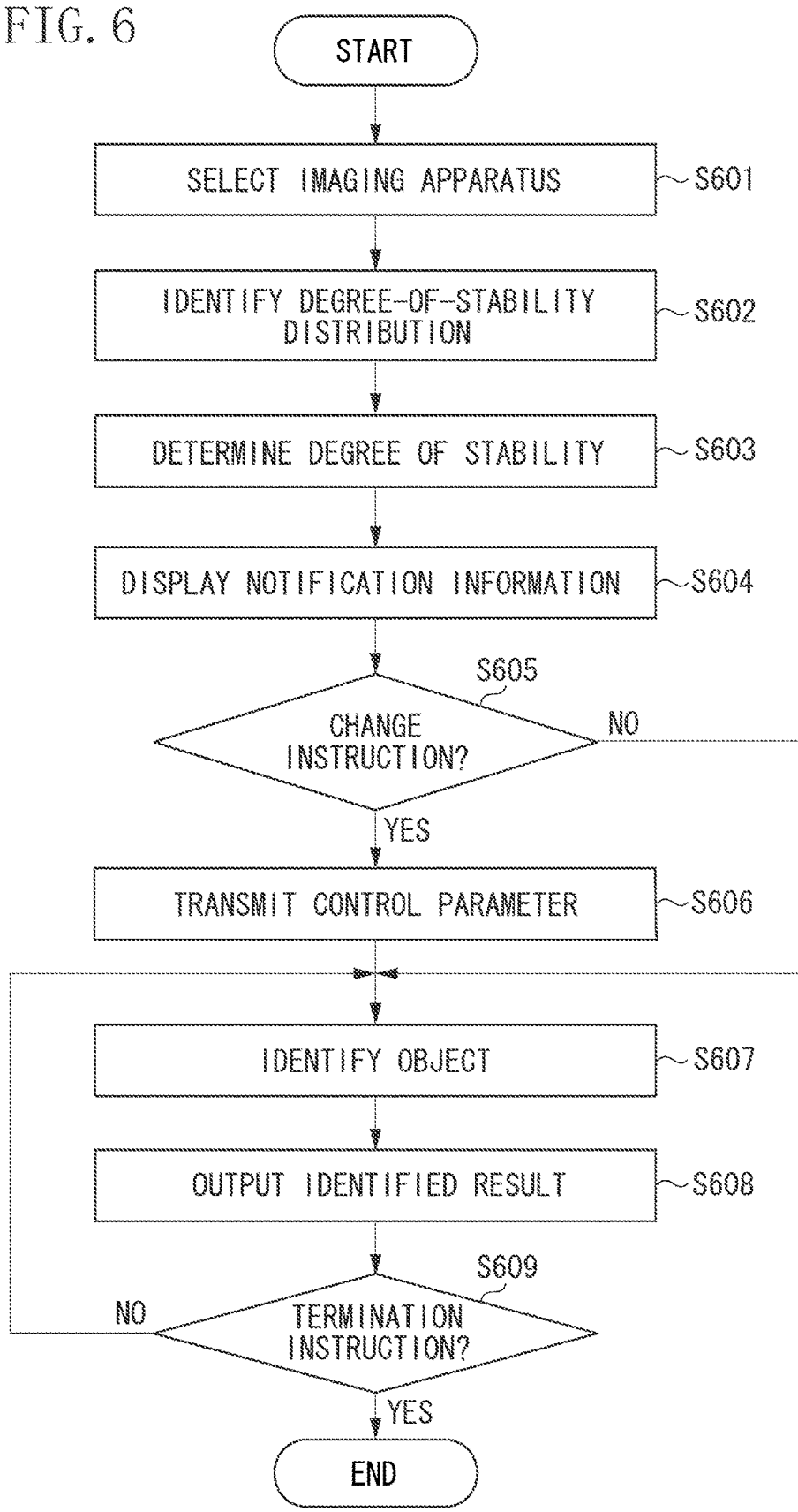
FIG. 6 is a flowchart illustrating identification processing.

FIG. 6 is a flowchart illustrating the identification processing. A user inputs the apparatus ID of each identification target imaging apparatus 110 to the input apparatus 205. In step S601, in response to the user input operation, the determination unit 311 accepts information about each target imaging apparatus 110 selected by the user. More specifically, the determination unit 311 accepts the apparatus ID of each imaging apparatus 110 having been input by the user via the input apparatus 205. Only one imaging apparatus 110 or a plurality of imaging apparatuses 110 may be selected in step S601. In step S602, the determination unit 311 identifies the degree-of-stability distribution associated with the apparatus ID input by the user, which is stored in the distribution storage unit 310.

In step S603, the determination unit 311 determines whether each region is appropriate for the identification processing, based on the degree-of-stability distribution. Namely, the determination unit 311 performs determination processing. More specifically, the determination unit 311 determines that a block in which the degree of stability is equal to or lower than a threshold value as a region not suitable for the identification processing. In this case, it is assumed that the threshold value is 0.4 or any other arbitrary value, and stored beforehand in the ROM 202. In step S604, the determination unit 311 generates information to be notified according to a determination result. Then, the determination unit 311 controls the display apparatus 206 to display the notified information. For example, if there are a predetermined number of blocks in which the degree of stability is equal to or lower than the threshold value, the determination unit 311 causes the display apparatus 206 to display a message such as "a region not suitable for the identification processing is included." The user can determine whether to cope with that after confirming such determination result. Further, if the degree-of-stability values corresponding to all blocks to which effective values are set are equal to or lower than the threshold value, the determination unit 311 causes the display apparatus 206 to display notified information informing that the identification processing by the imaging apparatus 110 selected by the user is unavailable. As mentioned above, the determination unit 311 causes the display apparatus 206 to display the information indicating whether the captured image is suitable for the analysis processing, as notified information.

Figure 7A:
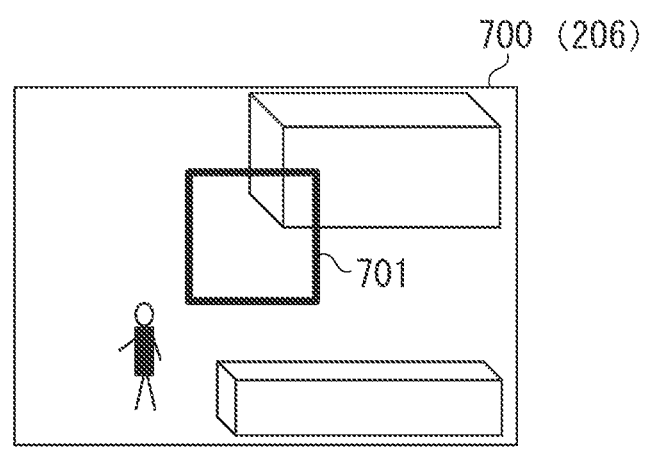
FIGS. 7A and 7B illustrate display examples of notified information.

As another example, the determination unit 311 may control the display apparatus 206 to superimpose an image (i.e., notified information) indicating a region in which the degree of stability is equal to or lower than the threshold value on a captured image (i.e., a video). In the present exemplary embodiment, the determination unit 311 identifies a circumscribed rectangular region of the block in which the degree of stability is equal to or lower than the threshold value as the region in which the degree of stability is equal to or lower than the threshold value. A captured image 700 illustrated in FIG. 7A includes a superimposed rectangular image 701 indicating a rectangular region in which the degree of stability is equal to or lower than the threshold value, as notified information. Therefore, the user can visually confirm a region in which the identification processing is likely to be failed.

Figure 7B:
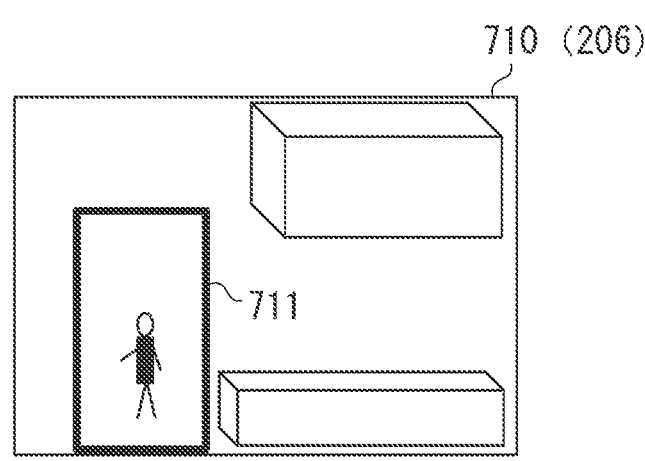

Further, as another example, the determination unit 311 may control the display apparatus 206 to superimpose an image (i.e., notified information) indicating a region in which the degree of stability is higher than the threshold value on a captured image (i.e., a video). In the present exemplary embodiment, the determination unit 311 identifies a circumscribed rectangular region of the block in which the degree of stability is higher than the threshold value as the region in which the degree of stability is higher than the threshold value. A captured image 710 illustrated in FIG. 7B includes a superimposed rectangular image 711 indicating a rectangular region in which the degree of stability is greater than the threshold value, as notified information. Therefore, the user can visually confirm a region in which the identification processing is likely to be successfully performed.

Furthermore, as another example, if there are a predetermined number or more of blocks in which the degree of stability is equal to or lower than the threshold value, the determination unit 311 can control the display apparatus 206 to display notified information that encourages the user to change the imaging conditions relating to pan, tilt, and zoom operations in such a manner that the region in which the degree of stability is greater than the threshold value accords with the photographing range. The region in which the degree of stability is equal to or lower than the threshold value may be a region determined based on the position of the block in which the degree of stability is equal to or lower than the threshold value, and is not limited to the above-mentioned example. The same thing can be said with respect to the region in which the degree of stability is greater than the threshold value.

The processing to be performed in step S603 is an example of output control processing for control the information processing apparatus to output notified information. The way of outputting the notified information is not limited to displaying the notified information. As another example, the information processing apparatus 100 may use a speaker as a sound notification device. Further, as another example, the information processing apparatus 100 may be configured to transmit the notified information to an external apparatus via the network 120.

The user inputs a change instruction regarding imaging conditions via the input apparatus 205 according to the notified information displayed in step S604, if necessary. In step S605, the imaging control unit 312 determines whether the change instruction has been received. In other words, the imaging control unit 312 performs acceptance processing. If the imaging control unit 312 determines that the change instruction has been received (Yes in step S605), the operation proceeds to step S606. If the imaging control unit 312 determines that the change instruction has not been received (No in step S605), the operation proceeds to step S607. In step S606, the imaging control unit 312 transmits control parameters corresponding to the change instruction to the imaging apparatus 110 selected by the user. If the imaging apparatus 110 receives the control parameters, the imaging apparatus 110 changes the setting of control parameters and starts an image-capturing operation based on the changed control parameters.

The information processing apparatus 100 performs the above-mentioned processing in steps S602 to S606 for all imaging apparatuses 110 selected in step S601. Through the above-mentioned processing, the information processing apparatus 100 changes the control parameters (e.g., an angle of view, a frame rate, and a shutter speed) of the imaging apparatus 110 appropriately in such a way as to realize imaging conditions suitable for the identification processing. Then, if the preparation completes, the identification unit 306 performs the identification processing in step S607 and subsequent steps.

In step S607, the identification unit 306 designates a frame image obtained after completing the preparation as a processing target, and performs processing for identifying (i.e., analyzing) a target object in images captured by the plurality of imaging apparatuses 110 based on feature quantities of the processing target frame image, while referring to the meta-data storage unit 305. For identifying two objects as the same object, it is useful to compare the distance between them with a predetermined threshold value. The identification unit 306 determines two objects as being identical if the distance between them is equal to or less than the threshold value. As an exemplary method, it is useful to learn the Euclid distance or the Mahalanobis distance beforehand to obtain the distance between objects. The identification unit 306 performs the identification processing for any combination of all imaging apparatuses 110 selected in step S601.

Figure 8:
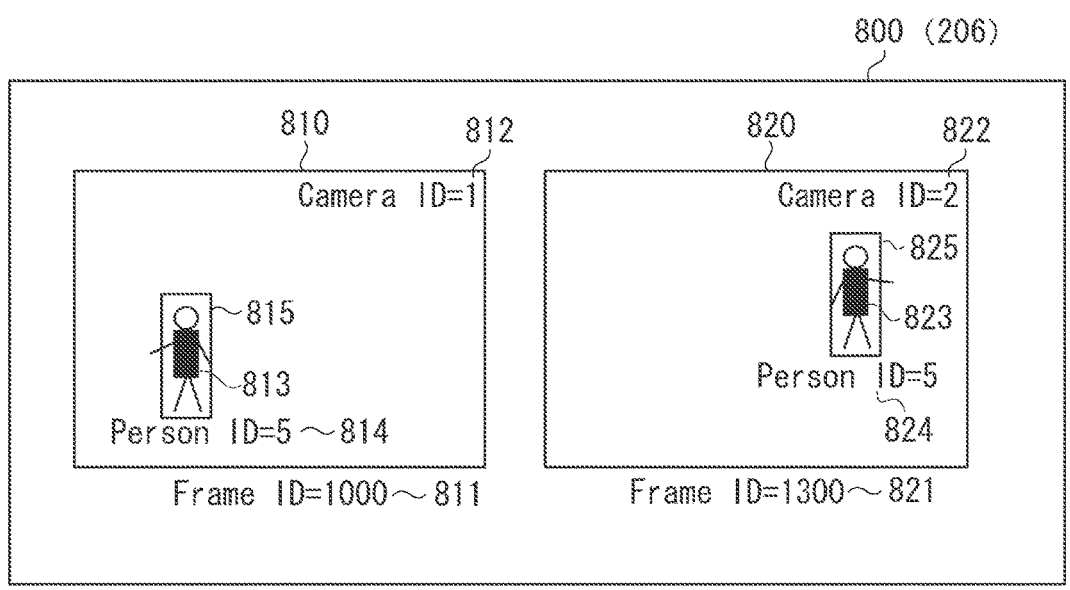
FIG. 8 illustrates a display example of identification results.

In step S608, the identification unit 306 controls the display apparatus 206 to display identification results. FIG. 8 illustrates a display example of identification results. An identification result screen 800 illustrated in FIG. 8 includes an image 810 captured by one imaging apparatus 110 (the apparatus ID=1) and an image 820 captured by another imaging apparatus 110 (the apparatus ID=2). Subsidiary information displayed along a lower portion of the captured image 810 is a frame image ID 811. Similarly, subsidiary information displayed along a lower portion of the captured image 820 is a frame image ID 821. Further, information superimposed on the captured images 810 and 820 are apparatus IDs 812 and 822. In a case where an object 813 in the captured image 810 is identical to an object 823 in the captured image 820, an object ID 814 superimposed on the captured image 810 is identical to an object ID 824 superimposed on the captured image 820, as illustrated in FIG. 8. Rectangular images 815 and 825 of the same colors are superimposed on the captured images 810 and 820 respectively, and indicate that the objects included therein are identical to each other. If the compared objects are different from each other, the information (an object ID, a color, etc.) to be superimposed on respective images is differentiated. Detailed display contents are not limited to the above-mentioned example. The identification unit 306 may display images according to any other methods if the user can recognize the position of the target object included in each captured image.

In step S609, the identification unit 306 determines whether a termination instruction has been received from the user via the input apparatus 205. If it is determined that the termination instruction has not been received (No in step S609), the operation returns to step S607. The identification unit 306 continues the identification processing. If it is determined that the termination instruction has been received (Yes in step S609), the identification unit 306 terminates the identification processing illustrated in FIG. 6.

As mentioned above, in the imaging system 10 according to the present exemplary embodiment, the information processing apparatus 100 can notify a user of accuracy reduction in the identification processing, i.e., the analysis processing to be performed based on feature quantities of an object. Accordingly, the user can check beforehand whether an image suitable for the analysis processing has been acquired. Further, the user can adjust the imaging conditions appropriately or can do any other necessary preparations. As a result, the information processing apparatus 100 can support a user to improve the accuracy of the analysis processing to be performed based on feature quantities of a target object.

As a first modified embodiment of the present exemplary embodiment, the degree-of-stability calculation unit 307 may be configured to calculate the degree of stability based on the moving speed. In this case, if there are a predetermined number or more of blocks in which the degree of stability is equal to or lower than the threshold value, the determination unit 311 may control the display apparatus 206 to display a notification that encourages the user to increase the frame rate of the imaging apparatus 110. Further, in a case where images captured by the imaging apparatus 110 are still images, the determination unit 311 may control the display apparatus 206 to display a notification that encourages the user to increase the shutter speed. In the case where the imaging apparatus 110 performs a still image capturing operation, the imaging apparatus 110 periodically captures still images and transmits the captured images to the information processing apparatus 100. Then, the information processing apparatus 100 designates each still image, instead of the above-mentioned frame image, as a processing target, and performs the degree-of-stability distribution calculation processing described with reference to FIG. 4 and the identification processing described with reference to FIG. 6.

As a second modified embodiment, the determination unit 311 may instruct the imaging control unit 312 to automatically change the imaging conditions instead of causing the display apparatus 206 to display the notified information in step S604, or in addition to the above-mentioned processing. For example, the determination unit 311 may instruct the imaging control unit 312 to change the imaging conditions relating to pan, tilt, and zoom operations in such a manner that a region in which the degree of stability is greater than the threshold value accords with the photographing range. In this case, the imaging control unit 312 transmits the instructed imaging conditions (i.e., control parameters) to the corresponding imaging apparatus 110. The above-mentioned processing is an example of change control processing for changing the imaging conditions. If the imaging apparatus 110 receives the control parameters, the imaging apparatus 110 starts an image-capturing operation based on the received control parameters.

As a third modified embodiment, the determination unit 311 may perform change processing for changing a target region of the identification processing to a region in which the degree-of-stability is equal to or greater than the threshold value, instead of causing the display apparatus 206 to display the notified information in step S604, or in addition to the above-mentioned processing. In this case, the identification unit 306 designates the region determined by the determination unit 311 as a new processing target, and performs the identification processing in the processing target region.

As a fourth modified embodiment, a plurality of apparatuses may cooperate with each other to realize the processing of the information processing apparatus 100 according to the present exemplary embodiment. For example, a first apparatus may perform processing precedently for calculating a degree-of-stability distribution. A second apparatus may receive the degree-of-stability distribution from the first apparatus to perform the identification processing illustrated in FIG. 6 based on the received degree-of-stability distribution. Further, as another example, the imaging apparatus 110 may be configured to perform a part of the processing to be performed by the information processing apparatus 100. For example, the imaging apparatus 110 may be configured to perform processing for generating meta-data including an object ID and feature quantities. In this case, the information processing apparatus 100 may receive the meta-data from the imaging apparatus 110 to perform the stability calculation processing.

The purpose of the present invention can be attained by the following method. More specifically, the method includes supplying a recording medium (or a storage medium), which stores software program codes capable of realizing the functions of the above-mentioned exemplary embodiments, to a system or an apparatus. Further, the method includes causing a computer (or a CPU or a microprocessor unit (MPU)) of the system or the apparatus to read the program codes from the recording medium and execute the program codes. In this case, the program codes read from the recording medium can realize the functions of the above-mentioned exemplary embodiments. The recording medium storing the program codes may constitute the present invention.

Further, the present invention is not limited to the computer that executes the program codes to realize the functions of the above-mentioned exemplary embodiment. The present invention encompasses an operating system (OS) that runs on the computer to perform a part or the whole of actual processing based on instructions of the program codes.

Furthermore, the present invention encompasses the following method that can realize the functions of the above-mentioned exemplary embodiments. The method includes reading program codes from a recording medium and writing the program codes into a function expansion card inserted in the computer or a memory equipped in a function expansion unit connected to the computer. The method includes causing a CPU provided on the function expansion card or the function expansion unit to perform a part or the whole of actual processing based on instructions of the program codes. In a case where the present invention is applied to the above-mentioned recording medium, the recording medium stores the program codes corresponding to the above-described flowcharts.

Although the present invention has been described with reference to some exemplary embodiments, the present invention is not limited to these specific exemplary embodiments, and can be changed or modified in various ways within the scope of the present invention.

As mentioned above, the information processing apparatus according to each of the above-mentioned exemplary embodiments can support a user to improve the accuracy of the analysis processing to be performed based on feature quantities of a target object.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-204025, filed Oct. 15, 2015, which is hereby incorporated by reference herein in its entirety.

What is claimed is:
1. An image analyzing apparatus, comprising:
a hardware processor; and
a memory for storing instructions to be executed by the hardware processor,
wherein, when the instructions stored in the memory are executed by the hardware processor, the image analyzing apparatus functions as:
a tracking unit configured to track an object in a photographing area of an imaging unit;
a calculation unit configured to calculate a degree of stability that indicates easiness in extracting stable feature quantities of the object in a plurality of partial regions of the photographing area of the imaging unit, based on a tracking result of the tracking unit;
an evaluation unit configured to evaluate whether a partial region from the plurality of partial regions is a region suitable for analysis processing to be performed based on feature quantities of the object, with reference to the degree of stability calculated by the calculation unit; and
an output control unit configured to control the image analyzing apparatus to output information reflecting an evaluation result obtained by the evaluation unit.

2. The image analyzing apparatus according to claim 1,
wherein the calculation unit calculates the degree of stability in the plurality of partial regions of the photographing area, and
wherein the evaluation unit evaluates whether each partial region is the region suitable for the analysis processing.

3. The image analyzing apparatus according to claim 1, wherein the evaluation unit performs evaluation based on whether the degree of stability is greater than a threshold value.

4. The image analyzing apparatus according to claim 1, wherein the output control unit controls the image analyzing apparatus to output information indicating whether a region is suitable for the analysis processing as information reflecting the evaluation result.

5. The image analyzing apparatus according to claim 1, wherein the output control unit controls the image analyzing apparatus to output information indicating a region suitable for the analysis processing as information reflecting the evaluation result.

6. The image analyzing apparatus according to claim 1, wherein the output control unit controls the image analyzing apparatus to output information indicating a region not suitable for the analysis processing as information reflecting the evaluation result.

7. The image analyzing apparatus according to claim 1, wherein the output control unit controls the image analyzing apparatus to output information encouraging a user to change the photographing area according to the evaluation result as information reflecting the evaluation result.

8. The image analyzing apparatus according to claim 1, wherein the image analyzing apparatus further functions as:
an acceptance unit configured to accept a change instruction from a user with respect to imaging conditions of the imaging unit; and
an analysis unit configured to perform the analysis processing on a captured image obtained based on the imaging conditions changed according to the change instruction.

9. The image analyzing apparatus according to claim 1, wherein the calculation unit calculates the degree of stability based on at least one of a change in moving direction and a moving speed of the object.

10. The image analyzing apparatus according to claim 1, wherein the imaging unit captures a plurality of still images as the captured image,
wherein the calculation unit calculates the degree of stability based on a moving speed of the object, and
wherein the output control unit controls the image analyzing apparatus to output information encouraging a user to change a shutter speed of the imaging unit as information reflecting the evaluation result.

11. The image analyzing apparatus according to claim 1, wherein the imaging unit captures a moving image,
wherein the calculation unit calculates the degree of stability based on a moving speed of the object, and
wherein the output control unit controls the image analyzing apparatus to output information encouraging a user to change a frame rate of the imaging unit as information reflecting the evaluation result.

12. The image analyzing apparatus according to claim 1, further comprising a tracking unit configured to track the object based on feature quantities of the object,
wherein the calculation unit calculates the degree of stability by using a tracking result obtained by the tracking unit as the track.

13. An image analyzing method for an image analyzing apparatus, comprising:
tracking an object in a photographing area of an imaging unit;
calculating a degree of stability that indicates easiness in extracting stable feature quantities of the object in a plurality of partial regions of the photographing area of the imaging unit, based on a tracking result of the tracking;
evaluating whether a partial region from the plurality of partial regions is a region suitable for analysis processing to be performed based on feature quantities of the object, with reference to the calculated degree of stability; and
controlling the image analyzing apparatus to output information reflecting an obtained evaluation result.

14. A non-transitory computer readable storage medium storing a program that causes a computer to function as:
a tracking unit configured to track an object in a photographing area of an imaging unit;
a calculation unit configured to calculate a degree of stability that indicates easiness in extracting stable feature quantities of the object in a plurality of partial regions of the photographing area of the imaging unit, based on a tracking result of the tracking unit;
an evaluation unit configured to evaluate whether a partial region from the plurality of partial regions is a region suitable for analysis processing to be performed based on feature quantities of the object, with reference to the degree of stability calculated by the calculation unit; and
an output control unit configured to control the image analyzing apparatus to output information reflecting an evaluation result obtained by the evaluation unit.

* * * * *